(12) United States Patent
Rudolph

(10) Patent No.: US 6,684,975 B2
(45) Date of Patent: Feb. 3, 2004

(54) METHOD FOR STEERING A VEHICLE AND STEERING SYSTEM THEREFORE

(75) Inventor: Tom Rudolph, Ames, IA (US)

(73) Assignee: Sauer-Danfoss Holding A/S (DK)

( * ) Notice: Subject to any disclaimer, the term of this patent is extended or adjusted under 35 U.S.C. 154(b) by 20 days.

(21) Appl. No.: 10/033,619

(22) Filed: Dec. 26, 2001

(65) Prior Publication Data

US 2002/0096387 A1 Jul. 25, 2002

(30) Foreign Application Priority Data

Dec. 28, 2000 (DE) .......................... 100 65 552

(51) Int. Cl.⁷ ................................................. B62D 13/00
(52) U.S. Cl. ........................................ 180/419; 180/418
(58) Field of Search ................................. 180/402, 403, 180/418, 419, 420, 415

(56) References Cited

U.S. PATENT DOCUMENTS

| | | | | |
|---|---|---|---|---|
| 4,117,905 A | * | 10/1978 | Mustered | 180/420 |
| 4,565,257 A | | 1/1986 | Hanson | |
| 4,771,851 A | * | 9/1988 | Nystuen et al. | 180/419 |
| 4,802,545 A | | 2/1989 | Nystuen et al. | |
| 5,137,292 A | * | 8/1992 | Eisen | 180/415 |
| 5,269,389 A | * | 12/1993 | Tomiyoshi et al. | 180/420 |
| 5,427,195 A | * | 6/1995 | Paul et al. | 180/308 |
| 5,908,081 A | * | 6/1999 | Olson | 180/418 |
| 6,016,885 A | * | 1/2000 | Hickman et al. | 180/418 |
| 6,129,170 A | * | 10/2000 | Hickman et al. | 180/418 |

FOREIGN PATENT DOCUMENTS

| | | | | |
|---|---|---|---|---|
| DE | 3543054 | | 6/1986 | |
| GB | 2144087 A | * | 2/1985 | B62D/5/06 |

* cited by examiner

Primary Examiner—Kevin Hurley
Assistant Examiner—Daniel Yeagley

(57) ABSTRACT

A method for steering a vehicle and a steering system (1) comprises: a vehicle, with a first wheel steering arrangement (10), and a second articulated steering arrangement (11), a steering unit (2) which is common for both steering (10, 11) arrangements and a sensor arrangement connected to a corrective device to sense a steering deflection of the second steering arrangement (11). A dead band is monitored by the steering deflection of the second steering (11) arrangement, a correction of the second steering (11) being effected when leaving the dead band and activating the first steering arrangement (10). The sensor arrangement has a dead band sensor (12) on the second steering (11), which is connected with a correcting device (14), which supplies pressurised fluid to the second steering (11) arrangements on leaving a predetermined dead band and activating the steering unit (2)

10 Claims, 1 Drawing Sheet

METHOD FOR STEERING A VEHICLE AND STEERING SYSTEM THEREFORE

FIELD OF INVENTION

The invention concerns a method for steering a vehicle, which is steered via a steering unit by a first steering arrangement, particularly a wheel steering, and a second steering, particularly an articulated steering, and a steering deflection means for detecting the second steering arrangements, with the steering unit operatively connected to both steering arrangements.

BACKGROUND OF THE INVENTION

A method and a steering system is shown in U.S. Pat. No. 4,565,257. The vehicle described therein can be steered in two ways: firstly by means of a wheel steering, which turns steered wheels in relation to a chassis. Secondly, the vehicle can also be steered by means of an articulated steering. This steering turns two vehicle parts, which are connected via a converting kit, in relation to each other.

Another vehicle, which is equipped with wheel and articulated steering, is shown in U.S. Pat. No. 4,802,545. Also DE 35 43 054 A1 shows a vehicle of this kind. With this vehicle, a steering occurs in that firstly the wheel steering is taken to the end stop, before a working cylinder for the articulated steering is activated.

Normally, such vehicles are used as building site vehicles or as self-propelled working machines. When such a vehicle drives straight ahead, it is substantially unavoidable that in connection with the second steering, particularly with an articulated steering, a deviation of the vehicle from the straight position occurs. The driver may find this deviation unpleasant, as the steering properties of the first steering are influenced by it.

BRIEF SUMMARY OF THE INVENTION

This task is solved in that a dead band is monitored by means of the steering deflection of the second steering and that a correction of the second steering is effected, when the dead band is left and the first steering is activated. This embodiment has several advantages. Firstly, when the second steering exceeds a permissible tolerance area, called a dead band, and only when the dead band is exceeded, is the intervention possible at all. All errors, which are within the range of the dead band, are tolerated. Usually they only have such small influence on the driving behaviour that they can be accepted. However, an intervention, which leads to a correction, does only occur when the driver activates the first steering. Thus, the driver is only very little influenced by the correction. As long as the driver drives straight ahead, no changes occur in the two steerings of the vehicle for the driver does not have to anticipate that a correction will change the driving behaviour of the vehicle in an unforeseen way.

The correction is only initiated, when, during the correction, the second steering steers the vehicle in the same direction as the first steering. This involves the advantage that the comfort for the driver is additionally improved. The driver usually feels nothing when the first steering is overruled by a correcting movement of the second steering.

The correction is initiated by switching the steering unit from the first to the second steering. This involves the advantage that no additional pressure source is required to correct the second steering. During steering, the steering unit supplies hydraulic fluid under pressure, which can then be used for the correction of the second steering.

Further, the correction is initiated at the beginning of a steering procedure. Thus, the actions of both steerings are decoupled. This has no negative influence on the steering behaviour as a whole, as usually the driver steers the vehicle with a feedback, that is, the driver tests visually or by feeling, if the vehicle has assumed the desired direction or not. If this is not the case, he intervenes in the first steering again.

Also, the correction is made in dependence of a rotational speed of a steering hand wheel. Thus, corrections can, for example, be limited to slow steering movements, so that a fast direction change of the vehicle will not be followed by a correcting movement of the second steering. For example, the correction can be limited to steering hand wheel speeds of less than 50 rotations per minute.

The task is also solved by means of a steering system as mentioned in the introduction in that the sensor arrangement has a dead band sensor at the second steering, which sensor is connected with a correcting device, which supplies pressurised fluid to the second steering on leaving a predetermined dead band and on activation of the steering unit.

Thus, the correction of the second steering is limited to such instants, during which the first steering is activated. The dead band sensor, together with the correcting device, acts as a locking element, which does not permit a correction when the first steering has not been activated.

A direction sensor is provided, which monitors a steering direction. The correcting device releases pressurised fluid only when a correcting direction and the steering direction correspond to each other. Thus, the driver is not unpleasantly affected if he steers in one direction, and the vehicle first makes a corrective movement in the other direction.

The correcting device is connected with a steering speed sensor and only releases pressurised fluid when the steering speed is lower than a predetermined value. Thus, corrections are limited to uncritical situations, in which the driver only intends to cause slow steering deflections or directional changes. When, however, the system senses that the driver intends to obtain fast directional changes with the vehicle, corrections do not occur. The information required for this is sent to the system from the steering speed sensor.

A selecting device is arranged between the steering unit and the steerings, and to initiate corrections, the correcting device activates the selecting device. The selecting device can function whether the steering unit must act upon the first steering, or upon the second steering. Apart from this function, the selecting device is able to switch over for a short while, without noticeable influencing the driver to supply the second steering with the amount of oil required to make a correction.

The dead band sensor is mechanically coupled with a control valve. This is a purely mechanical locking, which ensures that a correction can only take place when the second steering leaves its dead band. Only in this case does the control valve open to permit the pressure increase required to make a correction.

Therefore, a principal object of this invention is to provide a method and system for steering a vehicle which improves the driving behaviour of the vehicle.

DESCRIPTION OF THE PREFERRED EMBODIMENT

Figure 1:
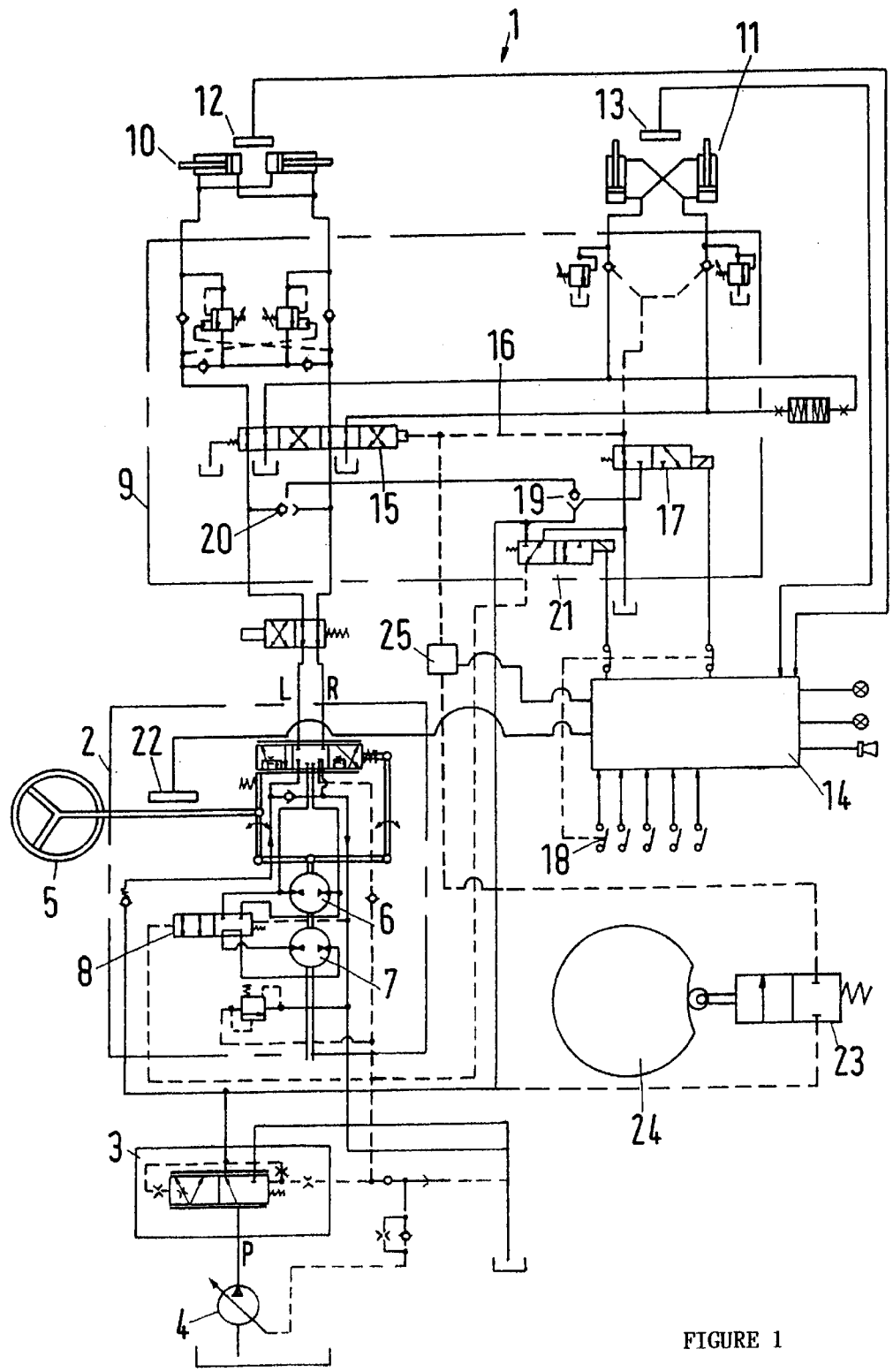
FIG. 1 is a schematic view of the steering system of this invention.

A steering system 1 has a steering unit 2, which is connected with a pump 4 via a priority valve 3. Therefore, hydraulic fluid under a pressure is available at a pressure inlet P. When the steering unit 2 is activated via a schematically shown steering hand wheel 5, an amount of this pressurised fluid will be passed on to one of two directional connections L, R, which amount is determined by the deflection of the steering hand wheel 5. The amount is measured by a measuring motor arrangement, which is formed by two measuring motors 6, 7, of which the first measuring motor 6 is permanently active, whereas the second measuring motor 7 can be connected in parallel with the first measuring motor 6 via a hydraulically operated change-over valve 8, to increase the displacement of the steering unit 2.

The steering unit 2, or rather, its two directional connections L, R, is connected with a valve block 9, which again is connected with a first steering motor arrangement 10 and a second steering motor arrangement 11. In the present case, the first steering motor arrangement 10 acts upon steered wheels, that is, it can turn the wheels (not shown) in relation to the chassis of a vehicle. The second steering motor arrangement 11, however, acts upon a converting kit, that is, it can change the angle position of two vehicle parts, which are connected with each other by means of a connecting kit, in relation to each other. Wheels are arranged on both vehicle parts, so that a change of the angle position of the two vehicle parts enables a steering, that is, a directional change, of the vehicle. The first steering motor arrangement 10 is provided with a sensor 12. The second steering motor arrangement is provided with a second sensor 13. Both sensors are connected with a control device 14, which does accordingly receive current information about the position and the state of the two steering motor arrangements 10, 11. Each steering motor arrangement 10, 11 is shown with two piston-cylinder units. However, it is obvious that both steering motor arrangements 10, 11 can also be equipped with only one piston-cylinder unit.

In the valve block 9 a selection valve 15 is arranged, by means of which the driver of the vehicle can select the steering motor arrangement 10, 11, that is, the steering mode, with which he wants to steer the vehicle. In the position of the selection valve 15 shown in the Figure, the vehicle is steered by means of a wheel steering, that is, via the first steering motor arrangement 10. When the selection valve 15 is displaced, the vehicle is steered by means of an articulated steering, that is, via the second steering motor arrangement 11. The selection valve is controlled by a pressure in a control line 16, which is connected with a priority valve 17, which again is activated by the control device 14, for example when the driver activates a switch 18. Further to the switch 18, a large number of additional switches and other control devices can be connected with the control device 14 via control inlets, which switches and devices are not described in detail in the present case.

The priority valve is connected with the pressure inlet P of the steering unit 2 via a change-over valve 19. The other inlet of the change-over valve 19 is connected with the outlet of an additional change-over valve 20, whose two inlets are connected with the direction outlets L, R of the control unit. Thus, an activation of the selection valve 15 is also possible, when the pump pressure P fails and the first measuring motor 6 has to serve as auxiliary pump.

The change-over valve 8 in the steering unit 2 is acted upon by change-over pressure through a second pilot valve 21, which is also activated by the control unit 14. The second pilot valve 21 is activated for a short period, for example 200 milliseconds, before the first pilot valve 17 is activated, so that a larger displacement of the steering unit 2 is automatically available for the change-over from the first steering motor arrangement 10 to the second steering motor arrangement.

The steering hand wheel 5 is provided with steering hand wheel sensor 22, which initially detects the direction of a movement of the steering hand wheel 5, but on the other hand is also suitable for the detection of the rotary speed of the steering hand wheel 5. The steering hand wheel sensor 22 is also connected with the control device 14.

The control line 16 cannot only be acted upon with control pressure via the pilot valve 17, but also through a control valve 23, which is activated by a cam disc 24. In this connection, the control valve 23 is fixed on one of the vehicle parts, which are joined by the converting kit mentioned above, while the cam disc 24 is fixed on the other of the two vehicle parts. When, thus, the two vehicle parts are deflected in relation to each other, the control valve 23 connects through from a predetermined deflection angle, which is, for example, in the range between ±10°, and permits a pressure build-up in the control line 16, which leads to a displacement of the position of the selection valve 15. In the line between the control valve 23 and the control line 16 an additional valve 25 may be arranged, which is controlled by the control device 14 in dependence of the steering direction.

The function of the steering system 1 will now be explained in connection with the control valve 23, which is controlled mechanically by means of the cam disc 24. It is obvious that a corresponding function can also be realised through the control device 14 by means of the pilot valve 17 and the sensor 13. Thus, for example, a fully electrical alignment of the vehicle can be obtained.

With the articulated steering driven by the second steering motor arrangement 11, it is relatively difficult always to set the neutral position, that is, to keep the vehicle in an accurately straight position. However, usually this is not necessary either. Small deviations in the straight position in a dead band, which permits deviations up to ±10°, are absolutely acceptable. These deviations can be reported to the control unit 14 by the sensor 13. As can be seen, a deviation of this kind can also be reported to the control valve 23 via the cam disc 24.

When the deviations in the articulated steering are larger than permitted by the dead band, a correction of the articulated steering is required, that is, hydraulic fluid under pressure must be supplied to the steering motor arrangement 11 in the correct direction. It must be ensured that the driving behaviour of the vehicle does not change abruptly, for example, the vehicle is not allowed to deviate from a once set straight forward driving.

For this reason, the correction of the steering motor arrangement 11 only takes place, when the driver activates the first steering motor arrangement 10 via the steering unit 2. This is then realised in that during an activation of the steering unit 2 by means of the steering hand wheel 5 (or another activation device) the selection valve 15 is briefly switched over, so that the hydraulic fluid from the steering unit 2 does no longer reach the first steering motor arrangement 10, but the second steering motor arrangement 11. This switching over only takes place when the second steering motor arrangement 11 in fact needs correction, that is, has left the dead band. In this case, for example, the cam disc 24 has switched the control valve 23 over in such a way that the pressure from the pressure connection P of the control unit 2 reaches the control line 16 and switches the selection valve 15 over.

An additional measure can now be taken, in that a correction only occurs, when the correction activation goes in the same direction, in which the driver wants to steer the vehicle. Otherwise, it could happen that the driver turns the steering hand wheel 5 in one direction and feels that the vehicle briefly turns in the other direction. For this purpose, the steering hand wheel sensor 22 is connected with the control device 14. Via the sensor 13, the control device 14 detects the correction direction and compares it with the rotation direction of the steering hand wheel 5. Only when the two directions correspond to each other, the valve 25 is opened to increase the pressure in the control line 16.

The steering hand wheel sensor 22 can also be used to determine the rotary speed of the steering hand wheel. It may be foreseen that corrections are only permitted in connection with slow rotary movements, for example less than 50 rotations per minute.

Basically, the correction of the second steering motor arrangement 11 has no negative effect on the steering behaviour of the vehicle. Normally, the driver does not steer the vehicle in accordance with angle markings on the steering hand wheel 5, but couples the direction, in which the vehicle moves, back on the steering hand wheel, that is, he corrects the felt direction of the vehicle on the steering hand wheel, when the direction does not yet correspond to the desired direction.

The embodiment shown has the advantage that an additional pressure supply is not required to perform the corrections on the second steering motor arrangement 11. The switching over of the selection valve 15 ensures that hydraulic oil under pressure reaches exactly the direction connection of the steering motor arrangement 11, which is required for the correction.

When the vehicle has been set straight, that is, the sensor 13 or the cam disc 24 shows that the articulation angle is within the dead band area, the pressure in the control line 16 is reduced and the selection valve 15 returns to the position shown. Of course the driver can open the pilot valve 17 by activating the switch 18, to perform a deliberate switching from the wheel steering with the first steering motor arrangement 10 to the articulated steering with the second steering motor arrangement 11.

It is therefore seen that this invention will achieve at least all of its stated objectives.

I claim:

1. A method for steering a vehicle, which is steered via a steering unit by a first wheel steering arrangement and a second articulated steering arrangement, characterised in that a dead band tolerance area within which a correction is possible is monitored by means of the steering deflection of the second steering arrangement so that a correction of the second steering arrangement is effected only when the first steering arrangement is activated.

2. A method according to claim 1, characterised in that the correction is only initiated when the second steering arrangement steers the vehicle in the same direction as the first steering arrangement.

3. A method according to claim 1 characterised in that the correction is initiated by switching the steering unit from the first to the second steering arrangement.

4. A method according to claim 1, characterised in that the correction is initiated at the beginning of a steering procedure.

5. A method according to claim 1, characterised in that the correction is made in dependence of a rotational speed of a steering hand wheel.

6. A steering system for a vehicle with a first wheel steering arrangement, a second articulated steering arrangement, one steering unit which is common for both steering arrangements, and a sensor arrangement, characterised in that the sensor arrangement (13; 23, 24) has a dead band sensor at the second steering arrangement (11), which sensor is connected with a correcting device (14), which supplies pressurised fluid to the second steering arrangement (11) on leaving a predetermined tolerance area on the dead band sensor and upon activation of the first wheel steering arrangement of the steering unit (2).

7. A steering system according to claim 6, characterised in that a direction sensor (22) is provided, which monitors a steering direction, the correcting device (14) releasing the pressurised fluid only when a correcting direction and the steering direction are the same.

8. A steering system according to claim 7, characterised in that the correcting device (14) is connected with a steering speed sensor and only releases pressurised fluid when the steering speed is lower than a predetermined value.

9. A steering system according to claim 6, characterised in that a selecting device (15) is arranged between the steering unit (2) and the steering arrangements (10, 11), the correcting device (14) activates the selecting device (15) to initiate corrections.

10. A steering system according to claim 6, characterised in that the dead band sensor (24) is mechanically coupled with a control valve (23) of the sensor arrangement.

* * * * *